United States Patent
Yang et al.

(10) Patent No.: US 10,998,814 B2
(45) Date of Patent: May 4, 2021

(54) POWER CONVERSION SYSTEM, CONTROLLER FOR THE SAME, AND METHOD FOR CONTROLLING THE SAME

(71) Applicant: SUNGROW POWER SUPPLY CO., LTD., Anhui (CN)

(72) Inventors: Zongjun Yang, Anhui (CN); Hua Ni, Anhui (CN); Xiaoxun Li, Anhui (CN); Haifeng Yang, Anhui (CN)

(73) Assignee: SUNGROW POWER SUPPLY CO., LTD., Anhui (CN)

( * ) Notice: Subject to any disclaimer, the term of this patent is extended or adjusted under 35 U.S.C. 154(b) by 0 days.

(21) Appl. No.: 16/797,054

(22) Filed: Feb. 21, 2020

(65) Prior Publication Data

US 2020/0274439 A1 Aug. 27, 2020

(30) Foreign Application Priority Data

Feb. 25, 2019 (CN) .......................... 201910138037.3

(51) Int. Cl.
*H02M 1/36* (2007.01)
*H02J 7/00* (2006.01)
*H02J 7/34* (2006.01)

(52) U.S. Cl.
CPC ............... *H02M 1/36* (2013.01); *H02J 7/007* (2013.01); *H02J 7/345* (2013.01); *H02J 2207/20* (2020.01)

(58) Field of Classification Search
CPC combination set(s) only.
See application file for complete search history.

(56) References Cited

U.S. PATENT DOCUMENTS

| 6,101,109 | A  | * | 8/2000 | Duba ...................... | H02M 7/49 363/41 |
| 8,436,555 | B2 | * | 5/2013 | Lo .......................... | H05B 45/37 315/299 |
| 8,643,282 | B2 | * | 2/2014 | Huang ................... | H05B 47/10 315/121 |
| 9,343,976 | B2 | * | 5/2016 | Chu ....................... | H02M 7/06 |

(Continued)

FOREIGN PATENT DOCUMENTS

| CN | 101814720 A | 8/2010 |
| CN | 107171581 A | 9/2017 |

(Continued)

*Primary Examiner* — Adam D Houston
(74) *Attorney, Agent, or Firm* — Cantor Colburn LLP

(57) ABSTRACT

A power conversion system, a controller for the same, and a method for controlling the same. The power conversion system includes a shutdown array and a power converter. The shutdown array includes multiple shutdown strings that are connected in parallel. Each of the multiple shutdown strings includes multiple shutdown devices, where outputs of the multiple shutdown devices are connected in series. An output terminal of the shutdown array is connected to an input terminal of the power converter. An input terminal of each of the multiple shutdown devices is connected to at least one direct-current power supply. The controller sends a shutdown instruction to each shutdown device of the shutdown array in response to receiving a rapid-shutdown command, controls the power converter to discharge an input capacitor of the power converter, and stops discharging the input capacitor in response to an input voltage of the power converter being reduced to a preset voltage.

13 Claims, 5 Drawing Sheets

(56) References Cited

U.S. PATENT DOCUMENTS

| | | | | |
|---|---|---|---|---|
| 9,544,956 | B2* | 1/2017 | Chen | H05B 45/37 |
| 9,559,589 | B2* | 1/2017 | Petersen | H02M 3/07 |
| 9,673,729 | B2* | 6/2017 | Perreault | G05F 1/571 |
| 10,680,513 | B2* | 6/2020 | Giuliano | H02M 3/07 |
| 10,720,846 | B2* | 7/2020 | Feng | H02M 1/32 |
| 10,804,697 | B2* | 10/2020 | Karino | H02J 3/38 |
| 10,833,599 | B2* | 11/2020 | Cummings | H02M 7/44 |
| 10,879,695 | B2* | 12/2020 | Matan | H02J 3/38 |
| 2010/0214055 | A1 | 8/2010 | Fuji et al. | |
| 2013/0039107 | A1 | 2/2013 | Fukuta | |
| 2017/0257039 | A1 | 9/2017 | Namou et al. | |
| 2018/0198365 | A1 | 7/2018 | Reiter | |
| 2020/0274439 | A1* | 8/2020 | Yang | H02J 7/007 |

FOREIGN PATENT DOCUMENTS

| | | |
|---|---|---|
| CN | 107710589 A | 2/2018 |
| CN | 108418447 A | 8/2018 |
| CN | 109149777 A | 1/2019 |

* cited by examiner

US 10,998,814 B2

POWER CONVERSION SYSTEM, CONTROLLER FOR THE SAME, AND METHOD FOR CONTROLLING THE SAME

CROSS-REFERENCE TO RELATED APPLICATIONS

The present invention claims priority under 35 U.S.C. § 119 to Chinese Patent Application No. 201910138037.3, filed on Feb. 25, 2019, the entire content of which is incorporated herein by reference.

FIELD

The present disclosure relates to the technology field of power electronics, and particularly, to a power conversion system, a controller for the power conversion system, and a method for controlling the power conversion system.

BACKGROUND

In a distributed power generation system, multiple direct-current (DC) power supplies are connected in series or in parallel as a whole, to provide a DC input voltage for a power converter. The DC input voltage is converted into a required output voltage by the power converter. An overall output voltage of the multiple DC power supplies may be as high as several hundred volts or even thousands of volts. Hence, there is a risk of an electric shock.

A conventional solution for preventing an electric shock is to provide a shutdown device for each DC power supply. In a case that someone approaches, a controller sends a shutdown instruction to each shutdown device, so as to shut down the output of each DC power supply. Thereby, all connections among the DC power supplies are cut off, and the DC power supplies stop providing the DC input voltage for the power converter.

A large amount of electric charges remains stored in an input capacitor of the power converter after shutting down the output of each DC power supply. Hence, the risk of the electric shock still exists in a case that the electric charges in the input capacitor are not discharged in time.

SUMMARY

In view of the above, a power conversion system, a controller for the power conversion system, and a method applied to a power conversion system, are provided according to embodiments of the present disclosure, so as to reduce an input voltage of a power converter below a safety voltage.

A controller for a power conversion system is provided, where the power conversion system includes a shutdown array and a power converter. The shutdown array includes multiple shutdown strings that are connected in parallel. Each of the multiple shutdown strings includes multiple shutdown devices, where outputs of the multiple shutdown devices are connected in series. An output terminal of the shutdown array is connected to an input terminal of the power converter. An input terminal of each of the multiple shutdown devices is connected to at least one direct-current power supply.

The controller is configured to: send a shutdown instruction to each shutdown device of the shutdown array in response to receiving a rapid-shutdown command, control the power converter to discharge an input capacitor of the power converter, and stop discharging the input capacitor in response to an input voltage of the power converter being reduced to a preset voltage.

In one embodiment, the controller does not control the power converter to discharge the input capacitor of the power converter, until a preset interval elapses after sending the shutdown instruction to each shutdown device.

In one embodiment, the power converter is a two-stage power converter including a pre-stage power conversion circuit and a post-stage power conversion circuit.

The controller is configured to discharge the input capacitor of the power converter through controlling power conversion of the pre-stage power conversion circuit, and stop discharging the input capacitor in response to an input voltage of the pre-stage power conversion circuit being reduced to the preset voltage.

In one embodiment, the controller is configured to control the power conversion of the pre-stage power conversion circuit by setting the preset voltage as a reference of the input voltage of the pre-stage power conversion circuit, and stop controlling the power conversion of the pre-stage power conversion circuit in response to the input voltage of the pre-stage power conversion circuit being reduced to the reference.

In one embodiment, the controller is configured to control the power conversion of the pre-stage power conversion circuit with a preset fixed duty ratio, and stop controlling the power conversion of the pre-stage power conversion circuit in response to the input voltage of the pre-stage power conversion circuit being reduced to the preset voltage.

In one embodiment, the power converter further includes a power source extracting power from an input capacitor of the post-stage power conversion circuit, and an output terminal of the power source is connected to the controller.

In one embodiment, the controller is configured to control the power conversion of the pre-stage power conversion circuit in an intermittent manner.

A power conversion system is provided, including a shutdown array and a power converter. The shutdown array includes multiple shutdown strings that are connected in parallel. Each of the multiple shutdown strings includes multiple shutdown devices, where outputs of the multiple shutdown devices are connected in series. An output terminal of the shutdown array is connected to an input terminal of the power converter. An input terminal of each of the multiple shutdown devices is connected to at least one direct-current power supply.

The power conversion system further includes any of the aforementioned controller for a power conversion system.

In one embodiment, the power conversion system further includes a controllable discharging circuit. The connected controllable discharging circuit is connected in parallel with the input capacitor of the power converter. The controllable discharging circuit includes a resistor and a third controllable switch that are connected in series.

The controller is configured to turn off the third controllable switch in response to receiving the rapid-shutdown command.

A method for controlling a power conversion system is provided, where the power conversion system includes a shutdown array and a power converter. The shutdown array includes multiple shutdown strings that are connected in parallel. Each of the multiple shutdown strings includes multiple shutdown devices, where outputs of the multiple shutdown devices are connected in series. An output terminal of the shutdown array is connected to an input terminal of the power converter. An input terminal of each of the multiple shutdown devices is connected to at least one direct-current power supply.

The method includes: determining that a rapid-shutdown command is received; sending a shutdown instruction to each shutdown device of the shutdown array; controlling the power converter to discharge an input capacitor of the power converter; and stopping discharging the input capacitor in response to an input voltage of the power converter being reduced to a preset voltage.

According to the aforementioned technical solutions, all shutdown devices are controlled to shut down the output of the direct-current power supplies in a case that someone approaches. Thereby, all connections among the DC power supplies are cut off, and the DC power supplies no longer provides an direct-current input voltage to the power converter. Further, operation of the power converter is controlled by the controller, so as to discharge the input capacitor of the power converter. Therefore, the input voltage of the power converter is reduced below a safety voltage without adding a hardware discharging circuit to the power converter.

BRIEF DESCRIPTION OF THE DRAWINGS

For clearer illustration of the technical solutions according to embodiments of the present disclosure or conventional techniques, hereinafter are briefly described the drawings to be applied in embodiments of the present disclosure or conventional techniques. Apparently, the drawings in the following descriptions are only some embodiments of the present disclosure, and other drawings may be obtained by those skilled in the art based on the provided drawings without creative efforts.

DETAILED DESCRIPTION

The technical solutions in the embodiments of the present disclosure will be described clearly and completely hereinafter in conjunction with the drawings in the embodiments of the present disclosure. Apparently, the described embodiments are only some rather than all of the embodiments of the present disclosure. Any other embodiments obtained based on the embodiments of the present disclosure by those skilled in the art without any creative effort fall within the scope of protection of the present disclosure.

Figure 1:
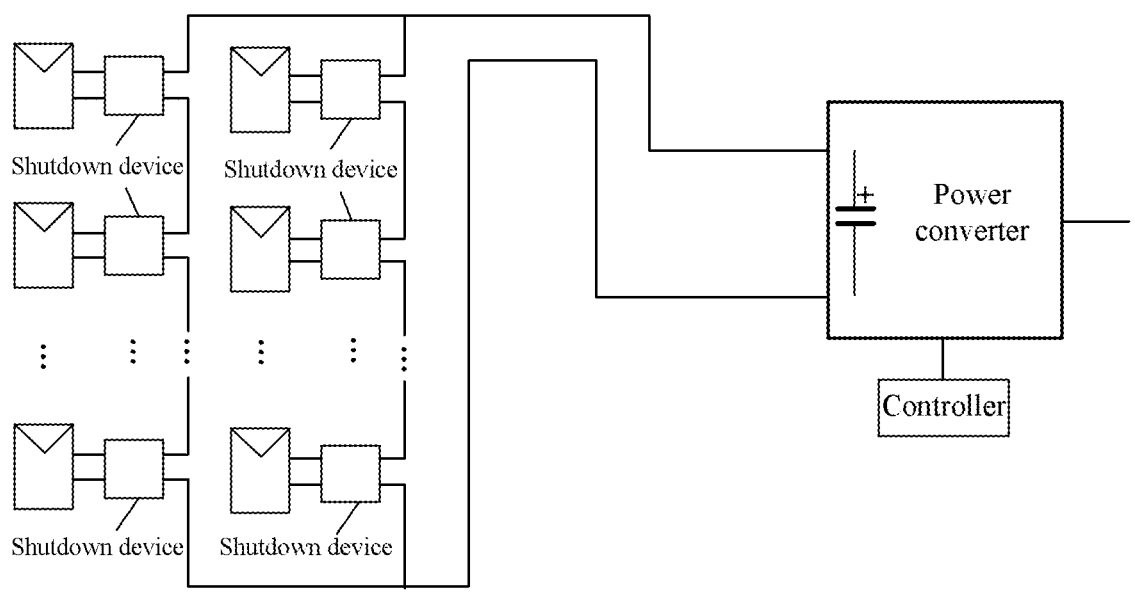
FIG. 1 is a schematic structural diagram of a controller for a power conversion system according to an embodiment of the present disclosure.

Reference is made to FIG. 1, which is a controller for a power conversion system according to an embodiment of the present disclosure.

The power conversion system includes a shutdown array and a power converter. The shutdown array includes multiple shutdown strings that are connected in parallel. Each of the multiple shutdown strings includes multiple shutdown devices, where outputs of the multiple shutdown devices are connected in series. An output terminal of the shutdown array is connected to an input terminal of the power converter. A distributed power generating system is constructed based on the power conversion system in conjunction with direct-current (DC) power supplies. An input terminal of each shutdown device is connected to at least one DC power supply. In a case that the input terminal of any shutdown device is connected to multiple DC power supplies, the multiple DC power supplies may be connected in series, in parallel, or in series-parallel. The DC power supply may be a photovoltaic module, a battery, a supper capacitor, a fuel cell, or the like. The power converter may be an inverter, a converter, an energy storage converter, or the like, which is not limited herein. In FIG. 1, it is taken as an example that the input terminal of each shutdown device is connected to a photovoltaic module, and a quantity of the shutdown strings is two.

Reference is further made to FIG. 1. During a process of normal power generation, the power converter transmits power from an input side to an output side, and provides power to a load at the output side. In a case that a person approaches the power converter, a controller receives a command for rapid shutdown. The rapid-shutdown command may be sent manually, may be sent automatically by an on-site equipment detecting the person approaching, or may be sent automatically by a remote server, which is not limited herein. The controller sends a shutdown instruction to each shutdown device in response to receiving the rapid-shutdown command. It is noted that communication connections between the controller and each shutdown device are not shown in FIG. 1. Accordingly, connections among the DC power supplies are cut off. Moreover, the controller controls the power converter to discharge an input capacitor of the power converter, and stops discharging the input capacitor in response to an input voltage of the power converter being reduced to a preset voltage. Therefore, the input voltage of the power converter is reduced below a safety voltage without adding an additional hardware discharging circuit to the power converter.

The controller controls the power converter to discharge the input capacitor of the power converter. In one embodiment, the controller communicates with a control unit of the power converter, and instructs the control unit to control the power converter to discharge the input capacitor of the power converter. The controller may communicate with each shutdown device and the control unit through IO signal communication, wireless communication, RS485 communication, CAN communication, power line carrier communication, or the like, which is not limited herein. In one embodiment, the controller and the control unit may be hardware elements that are independent from each other. Alternatively, logic functions of the controller may be integrated into the control unit, so as to reduce a cost of the power conversion system.

The power converter may be controlled to discharge the input capacitor when not all shutdown devices are completely turned off. In such case, the input capacitor of the power converter is still being charged by a part of the DC power supplies, which inevitably hinders the discharge of the input capacitor of the power converter. Thereby in one embodiment, the controller does not control the power converter to discharge the input capacitor of the power converter, until a preset interval elapses after sending the shutdown instruction to each shutdown device. Hence, it is ensured that all shutdown devices are turned off when the input capacitor of the power converter is being discharged.

The above function of delayed discharge may be implemented by the controller as follows. The controller sends the shutdown instruction to each shutdown device in response to receiving the rapid-shutdown command, and then waits for the preset interval before sending an instruction for discharging the input capacitor of the power converter to the control unit. Discharge of the input capacitor is stopped in response to the input voltage of the power converter being reduced to the preset voltage. Alternatively, the controller sends the shutdown instruction to each shutdown device in response to receiving the rapid-shutdown command, and simultaneously sends an instruction for discharging the input capacitor of the power converter to the control unit. The control unit of the power converter then waits for the preset interval before executing the instruction for discharging the input capacitor. Discharge of the input capacitor is stopped in response to the input voltage of the power converter being reduced to the preset voltage.

Figure 2:
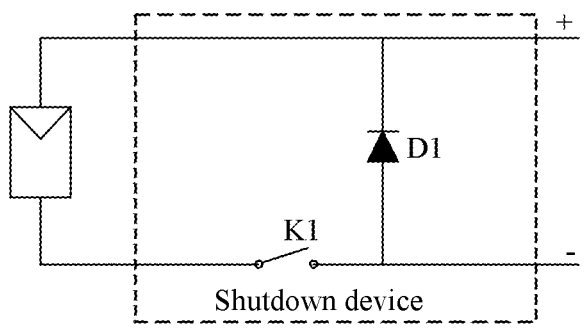
FIG. 2 is a schematic structural diagram of a shutdown device according to an embodiment of the present disclosure.

In any of the aforementioned embodiment, the shutdown device may include a diode D1 and a first controllable switch K1. The first controllable switch K1 is connected in series with an negative input terminal or a positive input terminal of the shutdown device. The diode D1 is connected in antiparallel between two output terminals of the shutdown device. Reference is made to FIG. 2. The controller shuts down the output of the corresponding DC power supply by turning off the first controllable switch K1. It is appreciated that the shutdown device may be implemented by using other hardware elements, as long as it is capable to shut down the output of the corresponding DC power supply. In an embodiment, the shutdown device may be implemented in a conventional topological structure, which is not described herein.

Figure 3:
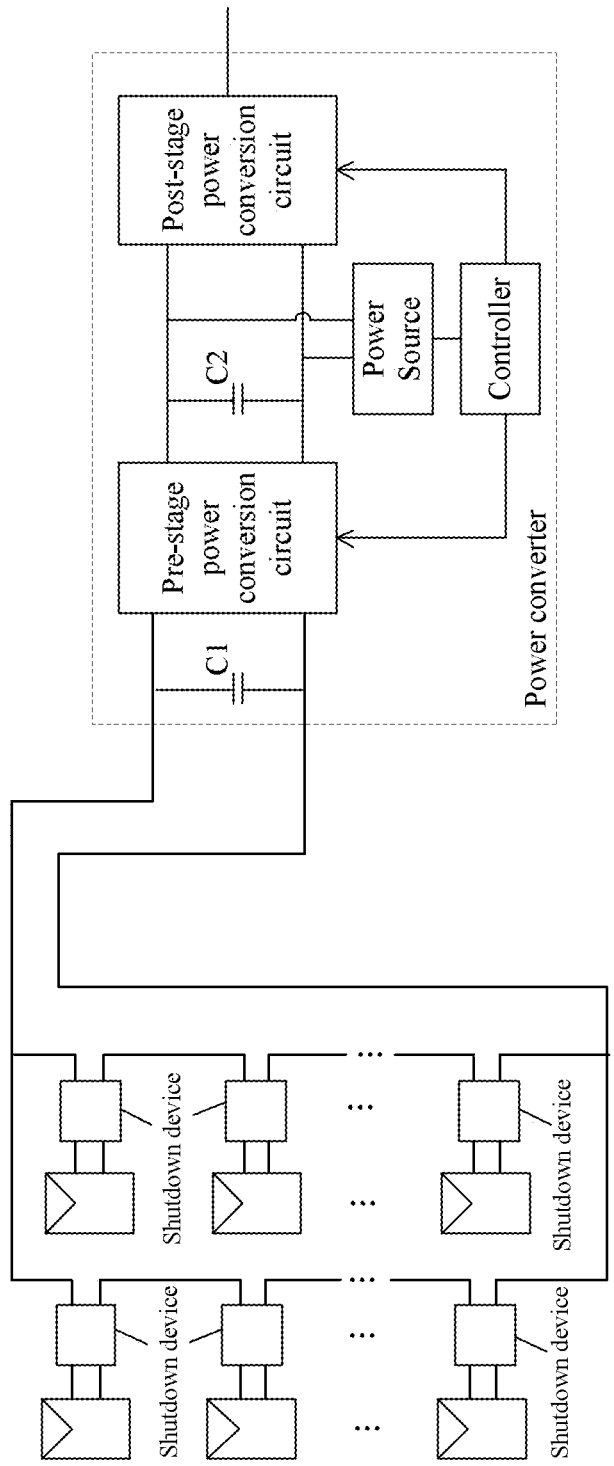
FIG. 3 is a schematic structural diagram of a controller for a power conversion system including a two-stage power converter according to an embodiment of the present disclosure.

Reference is made to FIG. 3. In any of the aforementioned embodiment, the power converter may be a two-stage power converter. The two-stage power converter may include multiple pre-stage power conversion circuits and a post-stage power conversion circuit. For example, the two-stage power converter may include a pre-stage booster circuit and a post-stage inverter circuit, and the booster circuit is usually a boost converter. Outputs of all the pre-stage power conversion circuits are connected in parallel, and connected to an input terminal of the post-stage power conversion circuit. Inputs of the pre-stage power conversion circuits are independent from each other. In FIG. 3, it is taken as an example that the two-stage power converter includes one pre-stage power conversion circuit and one post-stage power conversion circuit. In such case, the controller is configured to discharge the input capacitor (that is, capacitor C1 as shown in FIG. 3) of the power converter through controlling power conversion of the pre-stage power conversion circuit, and stop discharging the input capacitor in response to an input voltage of the pre-stage power conversion circuit (that is, the input voltage of the power converter, also a voltage across the capacitor C1) being reduced to the preset voltage. The preset voltage may be set according to a safety voltage on requirement. The power conversion of the pre-stage power conversion circuit transfers charges on the capacitor C1 to an input capacitor C2 of the post-stage power conversion circuit. Thereby, the voltage across the capacitor C1 is capable to be reduced below the safety voltage.

In a case that a quantity of the pre-stage power conversion circuits in the power converter is n (n≥1), an input terminal of each pre-stage power conversion circuit is provided with an input capacitor. Namely, a quantity of input capacitors in the power converter is n in total. In such case, controlling power conversion of the pre-stage power conversion circuit in discharging the input capacitor of the power converter refers to controlling power conversion of each pre-stage power conversion circuit simultaneously. A same control logic is applied by the controller to control each pre-stage power conversion circuit.

The controller may control the power conversion of the pre-stage power conversion circuit in a closed loop. For example, the controller controls the power conversion of the pre-stage power conversion circuit by setting the preset voltage as a reference of the input voltage of the power conversion circuit, and stops controlling the power conversion of the pre-stage power conversion circuit in response to the input voltage of the pre-stage power conversion circuit being reduced to the reference. Alternatively, the controller may control the power conversion of the pre-stage power conversion circuit in an open loop. For example, the controller controls the power conversion of the pre-stage power conversion circuit by using a preset fixed duty ratio, and stops controlling the power conversion of the pre-stage power conversion circuit in response to the input voltage of the pre-stage power conversion circuit being reduced to the preset voltage.

In the aforementioned embodiments, the charges on the capacitor C1 are transferred to the capacitor C2 due to the power conversion of the pre-stage power conversion circuit. Thereby, the capacitor C2 may not be discharged in time merely through an original discharging path of the power converter. Consequently, a voltage across the capacitor C2 may be excessive. Thereby in one embodiment, discharge of the capacitor C2 by be accelerated through a combination of one or more of the following manners.

In a first manner, the power converter further includes a power source extracting power from the input capacitor C2 of the post-stage power conversion circuit. An output terminal of the power source is connected to the controller, as shown in FIG. 3. The capacitor C2 are discharged, and the discharging is configured to supply power to the controller.

In a second manner, the controller controls the power conversion of the pre-stage power conversion circuit in an intermittent manner. For example, moments at which the power conversion of the pre-stage power conversion circuit is controlled are interleaved with intervals, for example, of 1 second. Thereby, instantaneous accumulation of excessive charges on the capacitor C2 is avoided.

In a third manner, power conversion of the post-stage power conversion circuit is also controlled. The charges on the capacitor C2 are consumed by a power device in the post-stage power conversion circuit, or transferred to a load of a subsequent stage.

In a fourth manner, a load other than the controller connected to a power source extracting power from the input capacitor C2 is switched on. For example, the load is a cooling fan.

According to the aforementioned embodiments, all shutdown devices are controlled to shut down the output of the direct-current power supplies in a case that someone approaches. Thereby, all connections among the DC power supplies are cut off. Further, operation of the power converter is controlled by the controller, so as to discharge the input capacitor of the power converter. Therefore, the input voltage of the power converter is reduced below a safety voltage without adding a hardware discharging circuit to the power converter.

A power conversion system is further provided according to an embodiment of the present disclosure. The power conversion system includes a shutdown array and a power converter. Each of the multiple shutdown strings includes multiple shutdown devices, where outputs of the multiple shutdown devices are connected in series. An output terminal of the shutdown array is connected to an input terminal of the power converter. An input terminal of each of the multiple shutdown devices is connected to at least one direct-current (DC) power supply. The power conversion system further includes any of the aforementioned controller for the power conversion system. Therefore, a voltage across an input capacitor C1 of the power converter is reduced below a safety voltage without adding an additional hardware discharging circuit to the power converter.

Figure 4:
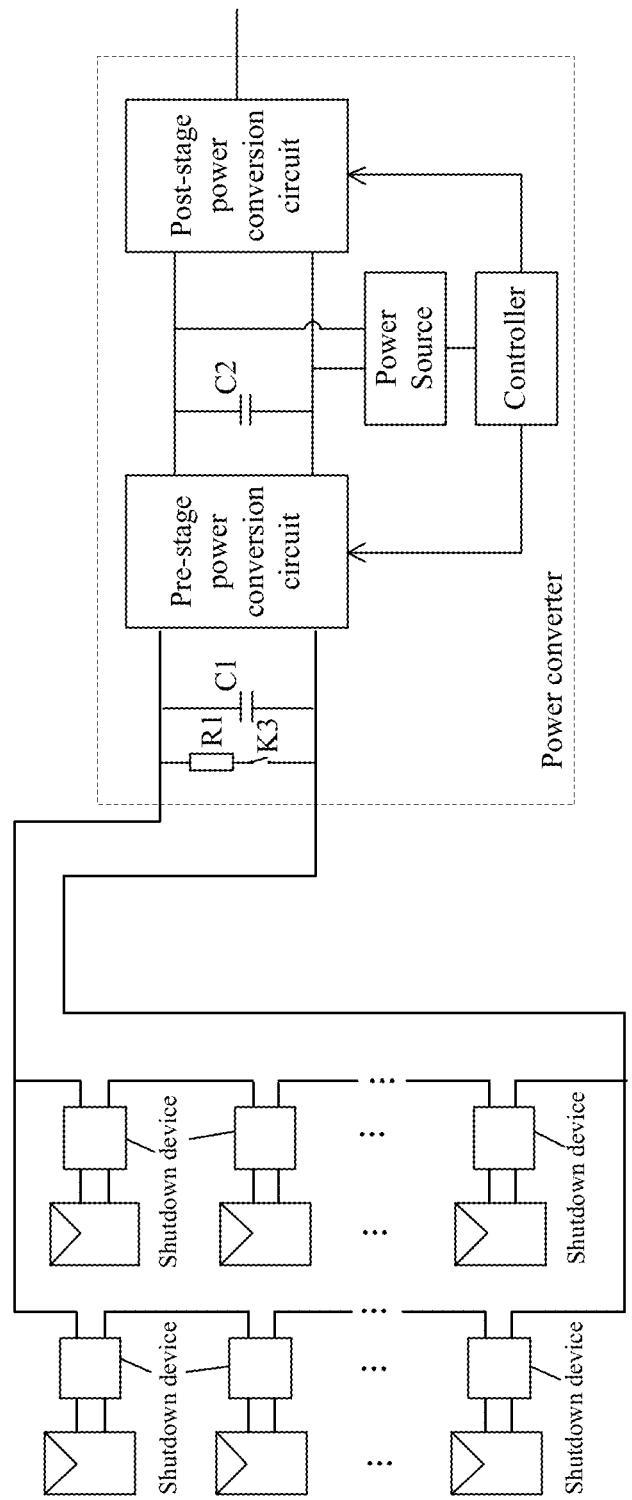
FIG. 4 is a schematic structural diagram of a power conversion system according to an embodiment of the present disclosure.

It is appreciated that a hardware discharging circuit may be added to the aforementioned power conversion system, in order to further accelerate discharging the capacitor C1. For example, the power conversion system may be provided with a controllable discharging circuit. The controllable discharging circuit is connected in parallel with the capacitor C1, and the controllable discharging circuit includes a resistor R and a third controllable switch K3 that are connected in series, as shown in FIG. 4. Correspondingly, the controller is further configured to turn off the third controllable switch in response to receiving the rapid-shutdown command. Therefore, discharge of the capacitor C1 is accelerated by consuming power via the resistor.

In a case that a quantity of pre-stage power conversion circuits in the power converter is n (n≥1), an input terminal of each pre-stage power conversion circuit is provided with an input capacitor. Namely, has a quantity of input capacitors in the power converter is n in total. In such case, each input capacitor is connected in parallel with a controllable discharging circuit as described above.

Figure 5:
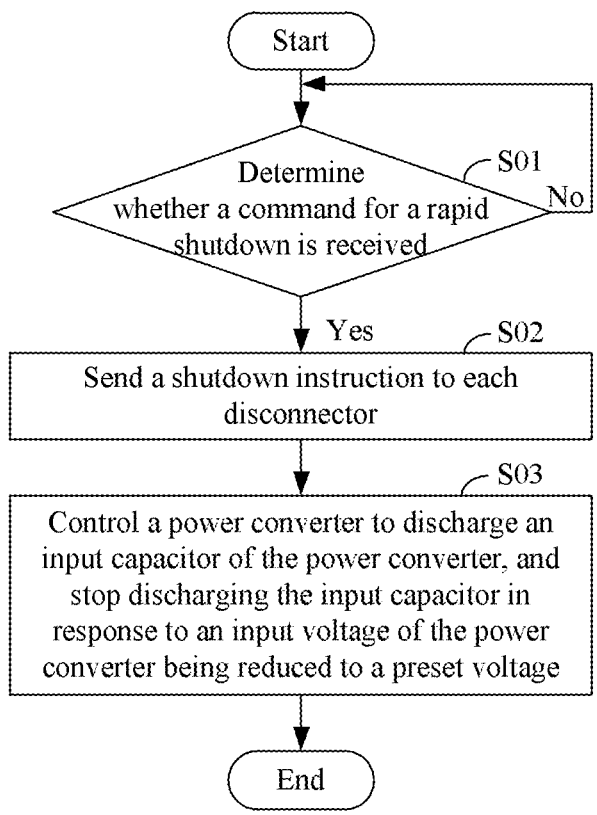
FIG. 5 is a flow chart of a method for controlling a power conversion system according to an embodiment of the present disclosure.

A method for controlling a power conversion system is also provided according to an embodiment of the present disclosure. The power conversion system includes a shutdown array and a power converter. The shutdown array includes multiple shutdown strings that are connected in parallel. Each of the multiple shutdown strings includes multiple shutdown devices, where outputs of the multiple shutdown devices are connected in series. An output terminal of the shutdown array is connected to an input terminal of the power converter. An input terminal of each of the multiple shutdown devices is connected to at least one direct-current (DC) power supply. Referring to FIG. 5, the method for controlling the power conversion system includes steps S01 to S03.

In step S01, it is determined whether a rapid-shutdown command is received. The method goes to step S02 in a case that the determination is positive. The method repeats the step S01 in a case that the determination is negative.

In step S02, a shutdown instruction is sent to each shutdown device of the shutdown array.

In step S03, the power converter is controlled to discharge an input capacitor of the power converter, and the input capacitor is stopped to be discharged in response to an input voltage of the power converter being reduced to a preset voltage.

Figure 6:
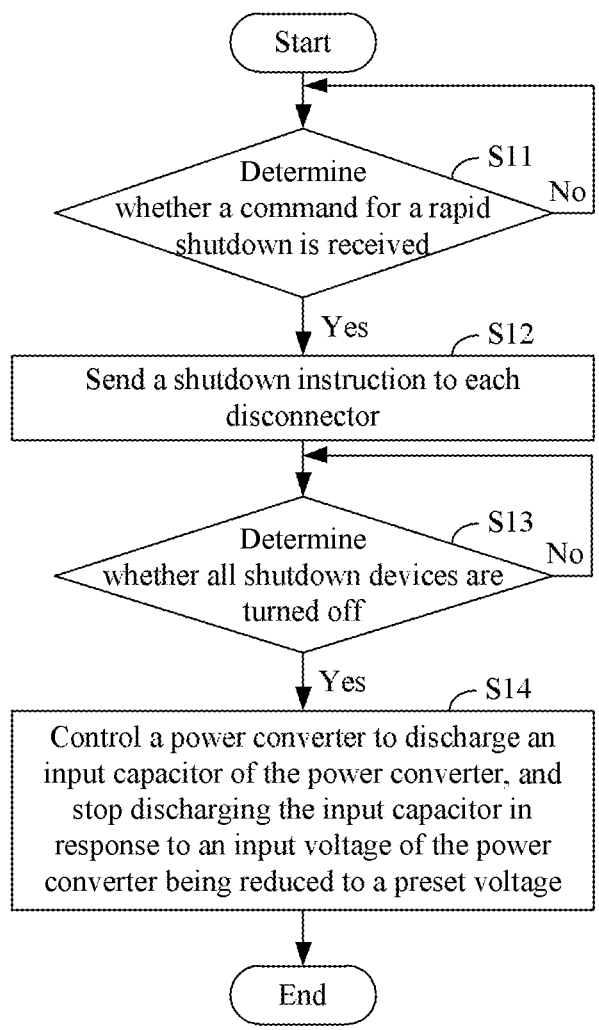
FIG. 6 is a flow chart of a method for controlling a power conversion system according to an embodiment of the present disclosure.

The power converter may be controlled to discharge the input capacitor when not all shutdown devices are completely turned off. In such case, the input capacitor of the power converter is still being charged by a part of the DC power supplies, which inevitably hinders the discharge of the input capacitor of the power converter. Thereby, another method for controlling the power conversion system is provided according to an embodiment of the present disclosure. Referring to FIG. 6, such method for controlling the power conversion system includes the steps S11 to S14.

In step S11, it is determined whether a rapid-shutdown command is received. The method goes to step S12 in a case that the determination is positive. The method repeats the step S11 in a case that the determination is negative.

In step S12, a shutdown instruction is sent to each shutdown device of the shutdown array.

In step S13, it is determined that whether each shutdown device of the shutdown array is turned off. The method goes to step S14 in a case that the determination is positive. The method repeats step S13 in a case the determination is negative.

In step S14, the power converter is controlled to discharge an input capacitor of the power converter, and the input capacitor is stopped to be discharged in response to an input voltage of the power converter being reduced to a preset voltage.

In one embodiment, after sending the shutdown instruction to each shutdown device, the power converter waits for a preset interval before controlling the power converter to discharge the input capacitor of the power converter. Thereby, it is ensured that all shutdown devices are turned off when the input capacitor of the power converter is being discharged.

The embodiments in this specification are described in a progressive manner. Each embodiment lays emphasis on differences from other embodiments. For the same or similar parts between the embodiments, one may refer to the description of other embodiments. Since the method embodiment is similar to the controller and system embodiments, the description for the method embodiment is relatively simple. For related parts, reference may be made to description in the controller and system embodiments.

It should be noted that, the relationship terms such as "first", "second" and the like are only used herein to distinguish one entity or operation from another, rather than to necessitate or imply that an actual relationship or order exists between the entities or operations. Furthermore, the terms such as "include", "comprise" or any other variants thereof means to be non-exclusive. Therefore, a process, a method, an article or a device including a series of elements include not only the disclosed elements but also other elements that are not clearly enumerated, or further include inherent elements of the process, the method, the article or the device. Unless expressively limited, the statement "including a . . . " does not exclude the case that other similar elements may exist in the process, the method, the article or the device other than enumerated elements.

The device embodiments described above are merely illustrative, and the units described as separate components may or may not be physically separated. The components displayed as units may or may not be physical units, that is, they may be located in one place, or may be distributed to multiple network elements. Some or all of the modules may be selected according to actual requirements to achieve the objective of the technical solutions of the embodiments. Those skilled in the art can understand and implement the technical solutions of this application without creative efforts.

According to the description of the disclosed embodiments, those skilled in the art can implement or use the present disclosure. Various modifications made to these embodiments may be obvious to those skilled in the art, and the general principle defined herein may be implemented in other embodiments without departing from the spirit or scope of the present disclosure. Therefore, the present disclosure is not limited to the embodiments described herein but confirms to a widest scope in accordance with principles and novel features disclosed in the present disclosure.

The invention claimed is:

1. A controller for a power conversion system, wherein:
the power conversion system comprises a shutdown array and a power converter;
the shutdown array comprises a plurality of shutdown strings that are connected in parallel;
each of the plurality of shutdown strings comprises a plurality of shutdown devices, wherein outputs of the plurality of shutdown devices are connected in series;
an output terminal of the shutdown array is connected to an input terminal of the power converter;
an input terminal of each of the plurality of shutdown devices is connected to at least one direct-current power supply; and
the controller is configured to:
send a shutdown instruction to each shutdown device of the shutdown array in response to receiving a rapid-shutdown command;
control the power converter to discharge an input capacitor of the power converter; and
stop discharging the input capacitor in response to an input voltage of the power converter being reduced to a preset voltage.

2. The controller for the power conversion system according to claim 1, wherein the controller does not control the power converter to discharge the input capacitor of the power converter, until a preset interval elapses after sending the shutdown instruction to each shutdown device.

3. The controller for the power conversion system according to claim 1, wherein:
the power converter is a two-stage power converter comprising a pre-stage power conversion circuit and a post-stage power conversion circuit;
the controller is configured to:
discharge the input capacitor of the power converter through controlling power conversion of the pre-stage power conversion circuit, and
stop discharging the input capacitor in response to an input voltage of the pre-stage power conversion circuit being reduced to the preset voltage.

4. The controller for the power conversion system according to claim 2, wherein:
the power converter is a two-stage power converter comprising a pre-stage power conversion circuit and a post-stage power conversion circuit;
the controller is configured to:
discharge the input capacitor of the power converter through controlling power conversion of the pre-stage power conversion circuit, and
stop discharging the input capacitor in response to an input voltage of the pre-stage power conversion circuit being reduced to the preset voltage.

5. The controller for the power conversion system according to claim 3, wherein the controller is configured to:
control the power conversion of the pre-stage power conversion circuit by setting the preset voltage as a reference of the input voltage of the pre-stage power conversion circuit, and
stop controlling the power conversion of the pre-stage power conversion circuit in response to the input voltage of the pre-stage power conversion circuit being reduced to the reference.

6. The controller for the power conversion system according to claim 3, wherein the controller is configured to:
control the power conversion of the pre-stage power conversion circuit with a preset fixed duty ratio, and
stop controlling the power conversion of the pre-stage power conversion circuit in response to the input voltage of the pre-stage power conversion circuit being reduced to the preset voltage.

7. The controller for the power conversion system according to claim 1, wherein:
the power converter further comprises a power source extracting power from an input capacitor of the post-stage power conversion circuit, and
an output terminal of the power source is connected to the controller.

8. The controller for the power conversion system according to claim 2, wherein:
the power converter further comprises a power source extracting power from an input capacitor of the post-stage power conversion circuit, and
an output terminal of the power source is connected to the controller.

9. The controller for the power conversion system according to claim 1, wherein the controller is configured to control the power conversion of the pre-stage power conversion circuit in an intermittent manner.

10. The controller for the power conversion system according to claim 2, wherein the controller is configured to control the power conversion of the pre-stage power conversion circuit in an intermittent manner.

11. A power conversion system, comprising:
a shutdown array, comprising a plurality of shutdown strings that are connected in parallel, wherein each of the plurality of shutdown strings comprises a plurality of shutdown devices, outputs of the plurality of shutdown devices are connected in series, and an input terminal of each of the plurality of shutdown devices is connected to at least one direct-current power supply;
a power converter, wherein an output terminal of the shutdown array is connected to an input terminal of the power converter; and
a controller, configured to:
send a shutdown instruction to each shutdown device of the shutdown array in response to receiving a rapid-shutdown command;
control the power converter to discharge an input capacitor of the power converter; and
stop discharging the input capacitor in response to an input voltage of the power converter being reduced to a preset voltage.

12. The power conversion system according to claim 11, further comprising a controllable discharging circuit, wherein:
the connected controllable discharging circuit is connected in parallel with the input capacitor of the power converter;
the controllable discharging circuit comprises a resistor and a third controllable switch that are connected in series; and
the controller is configured to turn off the third controllable switch in response to receiving the rapid-shutdown command.

13. A method for controlling a power conversion system, wherein:

the power conversion system comprises a shutdown array and a power converter;

the shutdown array comprises a plurality of shutdown strings that are connected in parallel;

each of the plurality of shutdown strings comprises a plurality of shutdown devices, wherein outputs of the plurality of shutdown devices are connected in series;

an output terminal of the shutdown array is connected to an input terminal of the power converter;

an input terminal of each of the plurality of shutdown devices is connected to at least one direct-current power supply; and the control method comprises:

determining that a rapid-shutdown command is received;

sending a shutdown instruction to each shutdown device of the shutdown array;

controlling the power converter to discharge an input capacitor of the power converter; and stopping discharging the input capacitor in response to an input voltage of the power converter being reduced to a preset voltage.

\* \* \* \* \*